United States Patent [19]

Harris

[11] Patent Number: 4,786,356

[45] Date of Patent: Nov. 22, 1988

[54] HIGH FREQUENCY RESONATOR FOR WELDING MATERIAL

[75] Inventor: Everett A. Harris, Brookfield Center, Conn.

[73] Assignee: Branson Ultrasonics Corporation, Danbury, Conn.

[21] Appl. No.: 52,839

[22] Filed: May 21, 1987

[51] Int. Cl.$^4$ .......................... B06B 3/00; B29C 65/08
[52] U.S. Cl. ..................... 156/580.1; 156/580.2; 228/1.1; 310/322; 310/323; 310/334
[58] Field of Search ............... 156/73.1, 580.1, 580.2; 228/1.1; 310/322, 334; 313/323

[56] References Cited

U.S. PATENT DOCUMENTS 3,733,238 5/1973 Long et al. ..................... 156/580.1
4,146,416 3/1979 Goldman ......................... 156/580.1

FOREIGN PATENT DOCUMENTS 2259203 6/1974 Fed. Rep. of Germany .

Primary Examiner—Michael Wityshyn
Attorney, Agent, or Firm—Polster, Polster and Lucchesi

[57] ABSTRACT

A blade-shaped high frequency resonator for welding sheet material without a gap, when resonators of this shape are disposed in an array, includes at its output surface a pair of laterally extending ears, each ear terminating in end surfaces configured to interface with the end surfaces of a similarly shaped juxtaposed resonator. Each ear is dimensioned to cause the sum of the moments about the lateral axis of the resonator to be substantially zero. Typically, the lateral end surface of a respective ear is of a zigzag configuration. The end surface intersecting the lateral resonator axis intersects such axis at an angle of less than ninety degrees.

12 Claims, 3 Drawing Sheets

HIGH FREQUENCY RESONATOR FOR WELDING MATERIAL

BACKGROUND OF THE INVENTION

This invention concerns high frequency resonators, also known as horns, mechanical amplitude transformers, concentrators, etc. operating in the ultransonic frequency range and used for welding or seaming thermoplastic workpieces, such as superposed layers of sheet material. More specifically, this invention refers to the construction of a high frequency resonator used in conjunction with an apparatus for welding together layers of sheet material instead of sewing them. Apparatus used to vibration weld, preferably by ultransonic vibrations, superposed layers of thermoplastic sheet material in a predetermined pattern are well known in the art, see for instance U.S. Pat. No. 3,733,238 issued to D. D. Long et al dated May 15, 1973, entitled "Apparatus for Vibration Welding of Sheet Material".

The patent to Long et al explains the need to have an ultrasonic apparatus constructed to weld the entire width of materials passed through the apparatus. The problem encountered heretofore was that one could not construct an array of ultrasonic resonators spanning the entire width of the sheet material without the presence of gaps between the resonators. In order to avoid the gaps, Long et al disclose the use of two linear arrays of resonators wherein the second row of resonators fills the gaps of the first row of resonators. An arrangement for avoiding the need for two rows of resonators and using a single array of resonators is shown in U.S. Pat. No. 4,146,416 issued to H. S. Goldman dated Mar. 27, 1979 entitled "Apparatus for Vibration Welding of Material". This patent discloses blade-shaped resonators of a suitable configuration for causing two juxtaposed resonators to have interfacing surfaces. For instance, this patent shows resonators of trapezoidal and "T"-shaped cross-section to provide for interfacial relationships between laterally juxtaposed resonator surfaces in order to prevent the existence of gaps when passing sheet material through the apparatus.

Resonators of the last mentioned construction have a serious shortcoming in that the resonators are dynamically unbalanced about the lateral axis. Forces generated by the acceleration of an unbalanced resonator mass provide a couple which produces flexure motion thereby stimulating undesired flexural resonances. This phenomenon presents a serious problem in high gain blade-shaped resonators which are driven at a high mechanical amplitude. The undesirable mechanical stress condition resulting from the unbalanced resonator causes failure of the acoustical components of the apparatus.

SUMMARY OF THE INVENTION

The present invention discloses a resonator construction which overcomes the above stated shortcomings. A blade-shaped high frequency resonator is revealed which is provided at its output surface with laterally extending ears. The ears have end surfaces which interface with similar end surfaces of a juxtaposed resonator. For instance, the end surfaces are of a zigzag configuration which is matched by the end surfaces of a juxtaposed resonator. Most importantly, however, the ears are constructed to cause the sum of the moments about the centrally disposed lateral resonator axis to be substantially zero. Expressed otherwise, the ears are constructed to cause the moments about the lateral resonator axis on one side to be substantially equal to the moments on the other side of the axis, thereby effecting a balance of the moments.

One of the principal objects of this invention, therefore, is the provision of a new and improved high frequency resonator.

Another important object of this invention is the provision of a new and improved high frequency resonator useful in an ultrasonic welding apparatus for sheet material.

Another important object of this invention is the provision of a new and improved blade-shaped resonator adapted to operate in the ultrasonic frequency range having laterally extending ears with end surfaces constructed for providing an interfacing relationship with the end surfaces of a similarly constructed juxtaposed resonator and the ears being constructed to provide balanced mechanical moments about the lateral axis of the resonator.

A further important object of this invention is the provision of a new and improved blade-shaped resonator for ultrasonic welding having laterally extending ears at the output surface with laterally protruding end surfaces of zigzag configuration for providing an interfacing relationship with a similarly constructed resonator in juxtaposed position, and the ears being constructed to cause the sum of the moments about the centrally disposed lateral axis of the resonator to be substantially zero.

Other and still further objects of this invention will be more clearly apparent by reference to the following description when taken in conjunction with the accompanying drawings.

DETAILED DESCRIPTION OF THE INVENTION

Figure 1:
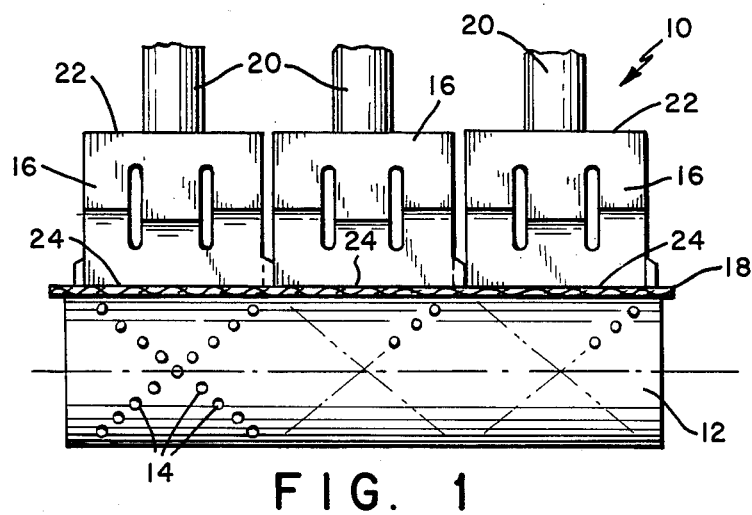
FIG. 1 is an elevational view depicting an ultrasonic welding apparatus for sheet material comprising a roller and an array of sources of vibratory energy.
Figure 2:
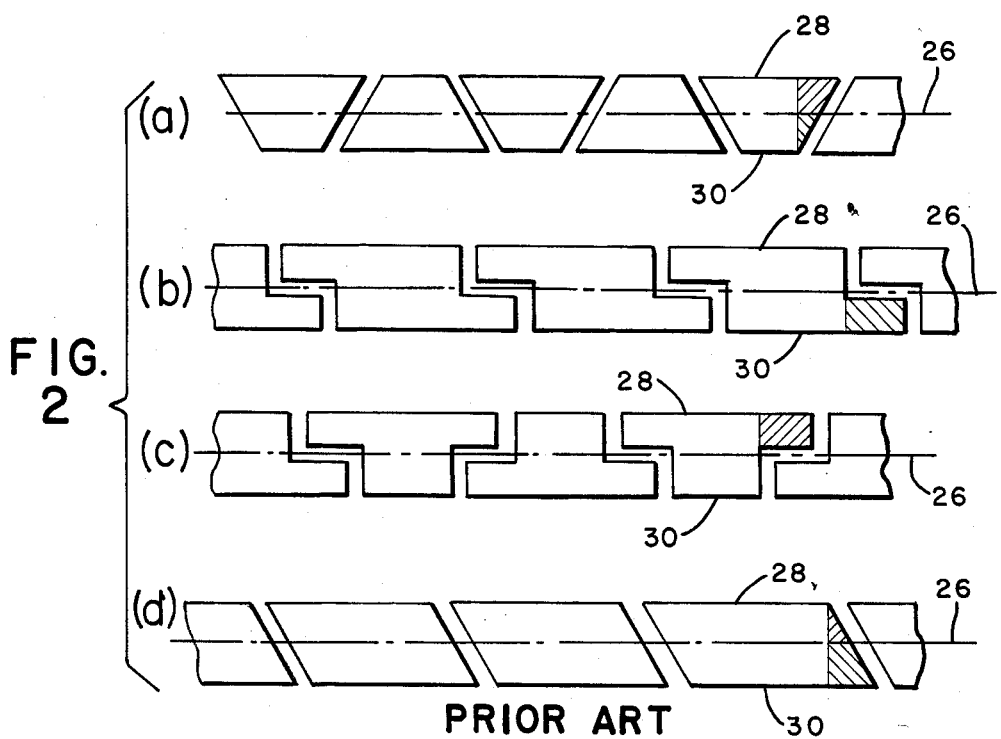
FIG. 2 is a plan view showing the cross section of high frequency resonators as proposed in the prior art.

Referring now to the figures and FIG. 1 in particular, there is shown a high frequency vibratory welding or sealing apparatus 10 comprising a rotatably mounted roller 12 provided along its surface with a pattern of raised welding surfaces in the form of raised pins 14, see Long et al. An array of juxtaposed high frequency resonators 16 is disposed to face the roller 12 and forms with the roller a nip through which sheet material 18 to be welded is fed. Each resonator 16 is mechanically coupled to an electroacoustic converter 20 which receives electrical high frequency energy from a suitable source, not shown, and provides high frequency mechanical vibrations to the input surface 22 of the associated resonator to cause the oppositely disposed output surface 24 of the resonator to transmit amplified high frequency vibrations to the sheet material 18. As a result, sheet material passed through the nip is welded in accordance with the pattern 14 on the roller 12. As will be noted, there is a single row of resonators 16 and in order to leave no gap, that is a not-welded portion in the sheet material 18 as it is fed through the nip which is the welding station, it has been proposed to use resonator cross-sections which cause juxtaposed lateral faces of the resonators to be in an interfacing relationship. FIG. 2 shows the cross sections proposed in Goldman supra. FIG. 2a shows a trapezoidal cross-section for the resonator, FIG. 2b shows a rectangular cross-section resonator with upper and lower extensions, FIG. 2c shows "T"-shaped cross-sections, and FIG. 2d shows parallelogram cross-sections. In each instance, the resonators are arranged in a single row or with interfacing lateral end surfaces when viewed in the direction along which the sheet material passes through the nip between the roller and resonators.

However, as illustrated in FIG. 2, resonators constructed in accordance with these designs are afflicted with a severe shortcoming in that the resonators are dynamically unbalanced, which condition causes the existence of highly undesirable flexural modes of vibration. Such vibrations, due to the high acceleration forces and mechanical gain at which resonators of this type operate, cause such an unbalance to be a serious problem, leading to unnecessary stress and failure of the resonator itself as well as failure of the associated converter 20. The unbalanced condition is depicted schematically in FIG. 2 where the lateral resonator axis has been drawn and designated by numeral 26. The resonator cross-section portion above and below the lateral resonator axis 26 has been indicated by cross-hatching and it will be noted that there exists a significant imbalance which causes the generation of flexural vibrations.

Figure 4:
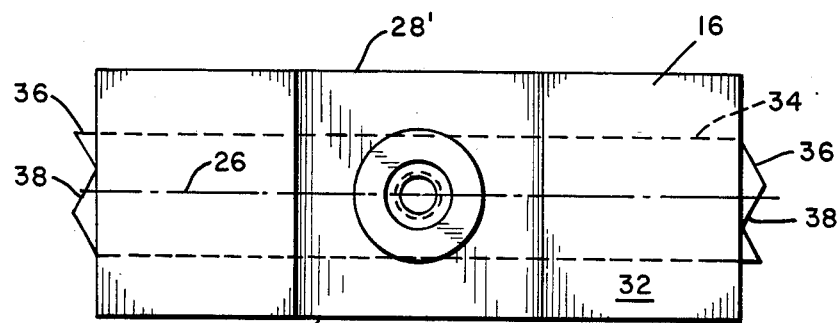
FIG. 4 is a top plan view of the the new and improved resonator per FIG. 3.

As used herein "lateral axis" of the resonator shall be defined as an axis disposed normal to the longitudinal axis 27 (FIG. 5) of the resonator and disposed centrally with respect to the large side surfaces 28 and 30 or 28' and 30' of the resonator, see FIGS. 2 and 4.

Figure 3:
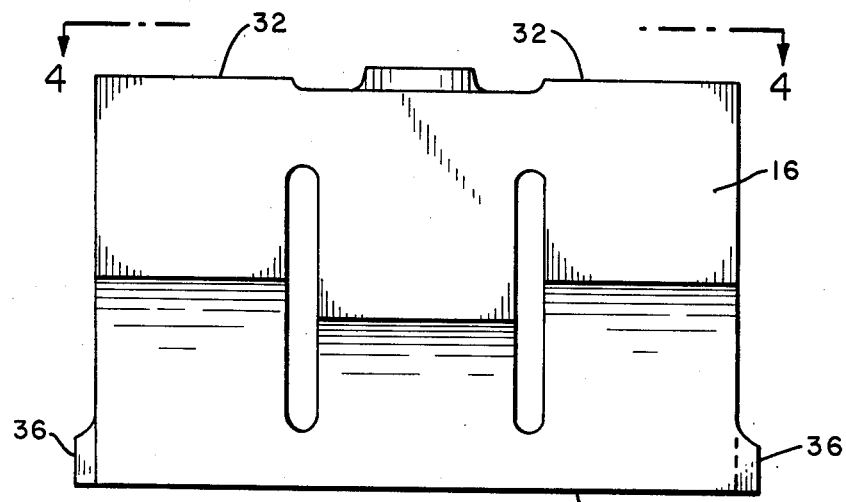
FIG. 3 is a side elevational view of the high frequency resonator constructed in accordance with the present invention.
Figure 5:
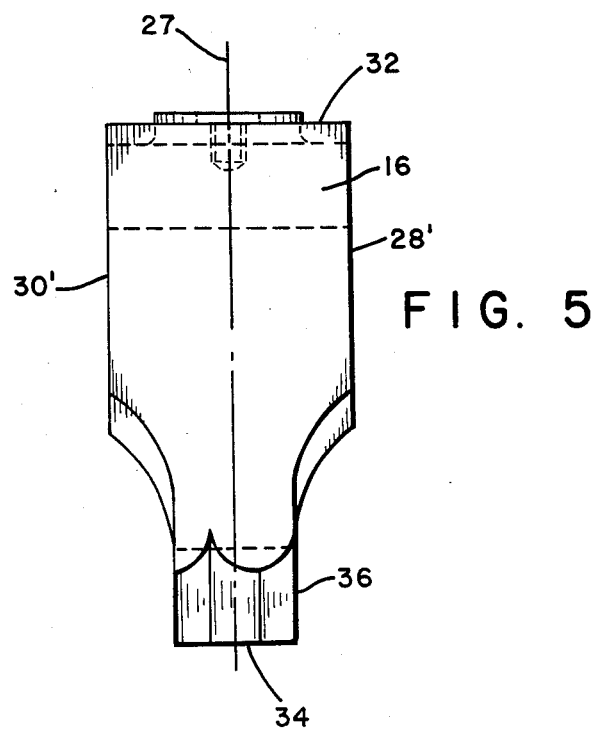
FIG. 5 is an elevational end view of the new resonator shown in FIG. 3.

The heretofore existing problem has been overcome by a resonator construction shown in FIGS. 3, 4 and 5. The resonator 16 basically is a blade-shaped resonator as illustrated and described in U.S. Pat. No. 4,651,043 issued to E. A. Harris et al, dated Mar. 17, 1987 entitled "Resonator Exhibiting Uniform Motional Output", see FIG. 2 of the patent. The resonator is dimensioned to cause it to be resonant as a half wavelength resonator for high frequency vibrations of predetermined frequency applied at the input surface 32 and traveling longitudinally therethrough to the oppositely disposed output surface 34 which transmits the vibration to the material in forced contact therewith. Under this condition, the input surface 32 and output surface 34 are disposed at antinodal regions of longitudinal vibration. In a typical example, the resonator is dimensioned to be resonant at a frequency of 20 kHz. However, the resonator may be dimensioned to be resonant at any other suitable high frequency, typically a frequency in the range between 16 kHz and 100 kHz.

The improvement in the resonator construction disclosed herein resides in the construction of the ears 36 extending laterally from the output surface 34.

Figure 6:
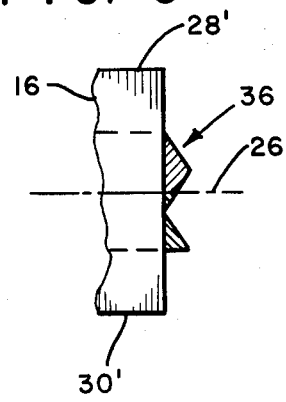
FIG. 6 is an explanatory illustration.

Importantly, the ears are dimensioned to cause the sum of the moments relative to the lateral resonator axis 26 to be substantially zero, that is, the sum of the mass increments times the distance from the lateral axis 26 is substantially zero. Expressed otherwise, the moments, above the axis 26 are equal to the moments below the axis 26, see FIG. 6. Thus, a balanced dynamic condition is achieved, thereby avoiding the generation of the undesired flexural resonances.

Figure 7:
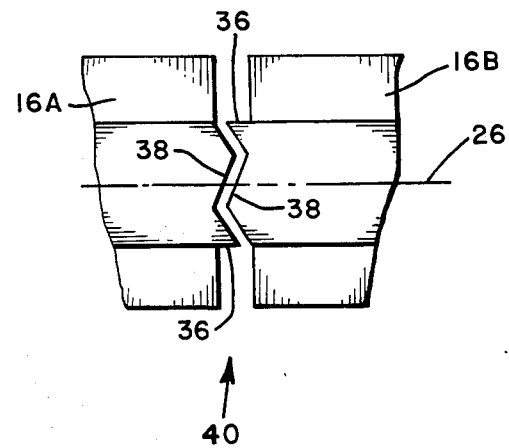
FIG. 7 is a view illustrating the interfacing relationship of resonator end surfaces when resonators are disposed in juxtaposed relation.

FIG. 7 shows the interfacing relationship of juxtaposed resonators 16, the resonators being arranged in a single row. The juxtaposed lateral end surfaces 38 of the ear 36 of the resonator 16A and those of the resonator 16B are disposed in an interfacing relationship. As sheet material to be welded is passed underneath the resonator in the direction of arrow 40 through the nip between the roller 12 and the resonators 16A and 16B, all portions of the sheet material are welded, substantially without leaving a gap.

When using an apparatus as shown in FIG. 1, namely a roller and an array of resonators, welding of the sheet material occurs along a line, substantially at a line coincident with the lateral resonator axis 26. In order to effect welding substantially without leaving a gap, it is important that the respective end surface 38 of the resonator intersect the lateral axis 26 of the resonator at an angle of less than 90 degrees. The preferred range is an angle between 30 and 60 degrees, see FIG. 7. This requirement essentially causes the lateral end surfaces to exhibit a zigzag pattern. Moreover, as shown the resonators are dimensioned to have a symmetrical pattern for causing each resonator to be in interfacing relationship with another resonator constructed similarly.

While there has been described and illustrated a preferred embodiment of the invention, it will be apparent to those skilled in the art that various changes and modifications may be made without departing from the broad principle of this invention which shall be limited only by the scope of the appended claims.

What is claimed is:

1. A blade shaped high frequency resonator having an input surface for receiving thereat high frequency vibrations and for transmitting such vibrations to an oppositely disposed output surface, said resonator being dimensioned to cause said input surface and said output surface to be disposed substantially at antinodal regions of vibrations transmitted longitudinally therethrough from said input surface to said output surface, the improvement comprising:

said output surface including two opposed lateral ends, each of said lateral ends comprising a laterally extending ear terminating in laterally disposed end surfaces, each of said ears being dimensioned for causing the sum of the moments of said ear about the lateral axis of said resonator to be substantially zero.

2. A blade shaped high frequency resonator as set forth in claim 1, the respective end surface intersecting the lateral axis of said resonator at an angle which is substantially between thirty and sixty degrees.

3. A blade shaped high frequency resonator as set forth in claim 2, the resonator being dimensioned to be resonant at a frequency of at least 16 kHz.

4. A blade shaped high frequency resonator as set forth in claim 1, the respective end surface intersecting the lateral axis of said resonator at an angle which is smaller than ninety degrees.

5. A blade shaped high frequency resonator as set forth in claim 1, the resonator being dimensioned to be resonant at a frequency of at least 16 kHz.

6. A blade shaped high frequency resonator having an input surface for receiving thereat high frequency vibrations and for transmitting such vibrations to an oppositely disposed output surface, said resonator being dimensioned to cause said input surface and said output surface to be disposed substantially at antinodal regions of vibrations transmitted longitudinally therethrough from said input surface to said output surface, the improvement comprising:

said output surface including two opposed lateral ends, each of said lateral ends comprising a laterally extending ear terminating in laterally disposed zigzag patterned end surfaces, each of said ears being dimensioned for causing the sum of the moments about the lateral axis of said resonator to be substantially zero, and the respective end surface intersecting the lateral axis of said resonator at an angle which is smaller than ninety degrees.

7. A blade shaped high frequency resonator as set forth in claim 6, the resonator being dimensioned to be resonant at a frequency of at least 16 kHz.

8. An ultrasonic welding apparatus for sheet material comprising:

a rotatable roller provided along its periphery with a pattern of sealing surfaces;

a plurality of high frequency resonators disposed along a linear array facing said roller for contacting sheet material fed through a nip formed by said roller and said facing resonators;

each of said resonators being blade shaped and having an input surface for receiving thereat high frequency vibrations and for transmitting such vibrations to an oppositely disposed output surface adapted to contact the sheet material fed through said nip, each resonator being dimensioned to cause its respective input surface and its respective output surface to be disposed substantially at antinodal regions of vibrations transmitted longitudinally through said resonator from said input surface to said output surface;

the output surface of each resonator including two opposed lateral ends, each of said lateral ends comprising a laterally extending ear, each of said ears being dimensioned for causing the sum of the moments of said ear about the lateral axis of the respective resonator to be substantially zero, and the respective end surfaces of two juxtaposed resonators being in an interfacial relationship for causing sheet material fed through the nip to be welded substantially without gap.

9. An ultrasonic welding apparatus as set forth in claim 8, each of said ears having lateral end surfaces configured in a zigzag pattern.

10. An ultrasonic welding apparatus as set forth in claim 9, each of said resonators dimensioned to be resonant at a frequency of at least 16 kHz.

11. An ultrasonic welding apparatus as set forth in claim 8, the respective end surface of an ear intersecting the lateral axis of the associated resonator at an angle which is smaller than ninety degrees.

12. An ultrasonic welding apparatus as set forth in claim 11, the respective end surface of an ear intersecting the lateral axis of the associated resonator at an angle substantially between thirty and sixty days.

* * * * *